United States Patent [19]

Hahn et al.

[11] Patent Number: 4,908,041
[45] Date of Patent: Mar. 13, 1990

[54] NAVY AND BLACK DYE MIXTURES: THIOPHENE AZO DISPERSE DYE AND RED, YELLOW OR ORANGE DISPERSE DYE

[75] Inventors: Erwin Hahn, Heidelberg; Guenter Hansen, Ludwigshafen; Karl-Heinz Etzbach, Frankenthal; Helmut Reichelt, Neustadt; Ernst Schefczik, Ludwigshafen; Helmut Degen, Frankenthal; Reinhold Krallmann, Weisenheim; Gerhard Wagenblast, Frankenthal, all of Fed. Rep. of Germany

[73] Assignee: BASF Aktiengesellschaft, Ludwigshafen, Fed. Rep. of Germany

[21] Appl. No.: 256,997

[22] Filed: Oct. 13, 1988

[30] Foreign Application Priority Data

Oct. 13, 1987 [DE] Fed. Rep. of Germany ....... 3734586

[51] Int. Cl.$^4$ .................. C09B 29/03; C09B 67/22
[52] U.S. Cl. ........................ 8/638; 8/639; 8/643; 8/922
[58] Field of Search .................. 8/639, 638, 643

[56] References Cited

U.S. PATENT DOCUMENTS 4,264,495 4/1981 Maher et al. .................. 534/733

FOREIGN PATENT DOCUMENTS 201896 11/1986 European Pat. Off.
59/204658 11/1984 Japan.
1434654 5/1976 United Kingdom.
1578733 11/1980 United Kingdom.
2193218 2/1988 United Kingdom.

*Primary Examiner*—A. Lionel Clingman
*Attorney, Agent, or Firm*—Oblon, Spivak, McClelland, Maier & Neustadt

[57] ABSTRACT

Navy and black dye mixtures contain one or more thiophene-azo dyes of the formula

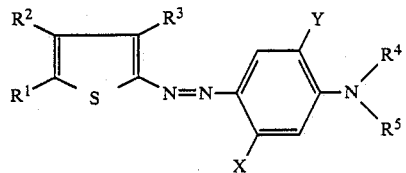

where $R^1$, $R^2$, $R^3$, $R^4$, $R^5$, X and Y each have defined meanings, and one or more dyes F whose absorption maximum is at a wavelength of from 390 to 520 nm, the proportion of thiophene-azo dyes being from 60 to 99% by weight, based on the total weight of thiophene-azo dyes and dyes F in the mixture.

4 Claims, No Drawings

NAVY AND BLACK DYE MIXTURES: THIOPHENE AZO DISPERSE DYE AND RED, YELLOW OR ORANGE DISPERSE DYE

The present invention relates to novel navy and black dye mixtures containing one or more thiophene-azo dyes having an aniline derivative as coupling component and one or more dyes F whose absorption maximum is at a wavelength of from 390 to 520 nm.

Thiophene-azo dyes having an aniline derivative as coupling component are known and described for example in EP-A-201,896. These dyes produce dyeings on polyester in brilliant violet to bluish green shades.

We have found, surprisingly, that navy and black shades are obtainable by mixing specific thiophene-azo dyes having an aniline derivative as coupling component with yellow and/or orange and/or red dyes.

The present invention accordingly provides navy and black dye mixtures containing one or more thiophene-azo dyes of the formula

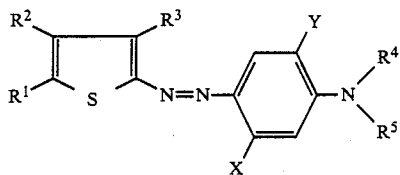

where $R^1$ is formyl, cyano or phenylsulfonyl, $R^2$ is halogen, $C_1$–$C_8$-alkoxy, substituted or unsubstituted phenoxy, $C_1$–$C_8$-alkylthio, phenylthio, $C_1$–$C_4$-alkylsulfonyl or phenylsulfonyl, $R^3$ is cyano, $C_1$–$C_8$-alkoxycarbonyl whose alkyl chain may be interrupted by one or more oxygen atoms, carbamoyl or $C_1$–$C_4$-mono- or dialkyl-carbamoyl, $R^4$ and $R^5$ are identical or different and each is independently of the other $C_1$–$C_4$-alkyl which may be substituted by hydroxyl, $C_1$–$C_4$-alkoxy, cyano, $C_1$–$C_4$-alkanoyloxy, $C_1$–$C_4$-alkoxycarbonyloxy or $C_1$–$C_4$-alkylaminocarbonyloxy, X is hydrogen, $C_1$–$C_4$-alkyl, $C_1$–$C_4$-alkoxy, chlorine, bromine or the radical —NH—CO—$R^6$ where $R^6$ is $C_1$–$C_4$-alkyl, which may be substituted by $C_1$–$C_4$-alkoxy, phenoxy, cyano, hydroxyl, chlorine or $C_1$–$C_4$-alkanoyloxy, or is unsubstituted or $C_1$–$C_4$-alkoxy-substituted phenoxy, and Y is hydrogen, $C_1$–$C_4$-alkyl or $C_1$–$C_4$-alkoxy, and one or more dyes F whose absorption maximum is at a wavelength of from 390 to 520 nm, wherein the proportion of thiophene-azo dyes is from 60 to 99% by weight, based on the total weight of thiophene-azo dyes and dyes F in the mixture.

All the alkyl groups appearing in the abovementioned formula concerning the thiophene-azo dyes may be not only straight-chain but also branched.

If substituted phenyl groups appear in the formula of the thiophene-azo dyes, suitable substituents are for example $C_1$–$C_4$-alkyl, $C_1$–$C_4$-alkoxy or halogen.

If alkyl radicals interrupted by one or more oxygen atoms appear in the formula of the thiophene-azo dyes, preference is given to those radicals which are interrupted by one or two oxygen atoms.

$R^2$, X and Y are each for example methoxy, ethoxy, propoxy, isopropoxy, butoxy, isobutoxy or sec-butoxy.

$R^2$ is further for example pentyloxy, isopentyloxy, neopentyloxy, tert-pentyloxy, hexyloxy, heptyloxy, octyloxy, 2-ethylhexyloxy, fluorine, chlorine, bromine, phenoxy, 2-chlorophenoxy, 4-chlorophenoxy, 4-methylphenoxy, 4-methoxyphenoxy, methylthio, ethylthio, propylthio, isopropylthio, butylthio, isobutylthio, pentylthio, isopentylthio, hexylthio, methylsulfonyl, ethylsulfonyl, propylsulfonyl, isopropylsulfonyl or butylsulfonyl.

X and Y are each further for example methyl, ethyl, propyl, isopropyl, butyl, isobutyl, sec-butyl or tert-butyl.

$R^3$ is for example methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl, tert-pentyloxycarbonyl, hexyloxycarbonyl, 2-methoxyethoxycarbonyl, 2-ethoxyethoxycarbonyl, 2-propoxyethoxycarbonyl, 2-butoxyethoxycarbonyl, 2- or 3-methoxypropoxycarbonyl, 2- or 3-ethoxypropoxycarbonyl, 3,6-dioxaheptyloxycarbonyl, 3,6-dioxaoctyloxycarbonyl, methylcarbamoyl, ethylcarbamoyl, propylcarbamoyl, isopropylcarbamoyl, butylcarbamoyl, dimethylcarbamoyl, diethylcarbamoyl, dipropylcarbamoyl, dibutylcarbamoyl or N-methyl-N-ethylcarbamoyl.

$R^4$ and $R^5$ are each further for example 2-hydroxyethyl, 2- or 3-hydroxypropyl, 4-hydroxybutyl, 2-methoxyethyl, 2-ethoxyethyl, 2-propoxyethyl, 2-butoxyethyl, 2-cyanoethyl, 2-formyloxyethyl, 2-acetyloxyethyl, 2-propionyloxyethyl, 2-butyryloxyethyl, 4-acetyloxybutyl, 2-methoxycarbonyloxyethyl, 2-methylaminocarbonyloxyethyl, 2-ethylaminocarbonyloxyethyl, 2-propylaminocarbonyloxyethyl or 2-butylaminocarbonyloxyethyl.

If X is the radical NH—CO—$R^6$, $R^6$ is for example methyl, ethyl, propyl, isopropyl, butyl, methoxymethyl, ethoxymethyl, 1- or 2-methoxyethyl, 1- or 2-ethoxyethyl, phenoxymethyl, 1- or 2-phenoxyethyl, cyanomethyl, 2-cyanoethyl, 3-cyanopropyl, 4-cyanobutyl, hydroxymethyl, 1- or 2-hydroxyethyl, 2- or 3-hydroxypropyl, 4-hydroxybutyl, chloromethyl, 2-chloroethyl, formyloxymethyl, acetyloxymethyl, 2-formyloxyethyl, 2-acetyloxyethyl, 2-propionyloxyethyl, 2-butyryloxyethyl, 3-formyloxypropyl, 4-acetyloxybutyl, phenoxy, 2-methoxyphenoxy, 4-methoxyphenoxy, 4-ethoxyphenoxy or 4-isopropoxyphenoxy.

Dyes F which have an absorption maximum at a wavelength of 390 to 520 nm are for example members of the class of monoazo or disazo dyes, anthraquinone, methine dyes, quinophthalones, naphtholactam dyes, coumarin dyes or diphenylamino dyes.

Dyes F which are members of the class of monoazo or disazo dyes are for example C.I. Disperse Yellow 3 (11 855), C.I. Disperse Yellow 5 (12 790), C.I. Disperse Yellow 7 (26 090), C.I. Disperse Yellow 60 (12 712), C.I. Disperse Yellow 103, C.I. Disperse Yellow 114, C.I. Disperse Yellow 119, C.I. Disperse Yellow 126, C.I. Disperse Yellow 163, C.I. Disperse Yellow 180, C.I. Disperse Yellow 181, C.I. Disperse Yellow 182, C.I. Disperse Yellow 183, C.I. Disperse Yellow 198, C.I. Disperse Yellow 204, C.I. Disperse Yellow 211, C.I. Disperse Yellow 218, C.I. Disperse Yellow 223, C.I. Disperse Yellow 224, C.I. Disperse Yellow 227, C.I. Disperse Yellow 230, C.I. Disperse Yellow 231, C.I. Disperse Yellow 235, C.I. Disperse Orange 3 (11 005), C.I. Disperse Orange 13 (26 080), C.I. Orange 29 (26 077), C.I. Disperse Orange 30 (11 119), C.I. Disperse Orange 31, C.I. Disperse Orange 49, C.I. Disperse Orange 53, C.I. Disperse Orange 55, C.I. Disperse Orange 85, C.I. Disperse Orange 139, C.I. Disperse Orange 149, C.I. Disperse Orange 151, C.I. Disperse Red 50, C.I. Disperse Red 54:1, C.I. Disperse Red 65 (11 228), C.I. Disperse Red 72 (11 114), C.I. Disperse Red 74, C.I. Disperse Red 135, C.I. Disperse 167, C.I. Disperse Red 167:1, C.I. Disperse Red 184, C.I. Disperse Red 203, C.I. Disperse Red 224 or C.I. Disperse Red 279. (These names and those below are the customary Colour Index names for the dyes.)

Dyes F which are members of the class of anthraquinones are for example C.I. Disperse Yellow 51, C.I. Disperse Orange 11 (60 700), C.I. Disperse Red 60 (60 756), C.I. Disperse Red 91 or C.I. Disperse Red 92.

Dyes F which are members of the class of methine dyes are for example C.I. Disperse Yellow 12, C.I. Disperse Yellow 31 (48 000), C.I. Disperse Yellow 49, C.I. Disperse Yellow 61 (48 005), C.I. Disperse Yellow 88, C.I. Disperse Yellow 89, C.I. Disperse Yellow 90 (48 007), C.I. Disperse Yellow 93, C.I. Disperse Yellow 99 (48 420), C.I. Disperse Yellow 109, C.I. Disperse Yellow 116, C.I. Disperse Yellow 118, C.I. Disperse Yellow 124, C.I. Disperse Yellow 125, C.I. Disperse Yellow 131, C.I. Disperse Yellow 138, C.I. Disperse Yellow 142, C.I. Disperse Yellow 200, C.I. Disperse Yellow 201, C.I. Disperse Yellow 210 or C.I. Disperse Orange 47.

Dyes which are members of the class of quinophthalones are for example C.I. Disperse Yellow 54 (47 020) or C.I. Disperse Yellow 64 (47 023).

Dyes which are members of the class of coumarins are for example C.I. Disperse Yellow 82 or C.I. Disperse Yellow 216.

A dye of the class of naphtholactams is for example C.I. Disperse Yellow 215.

Dyes which are members of the class of diphenylamines are for example C.I. Disperse Yellow 1 (10 345), C.I. Disperse Yellow 9 (10 375), C.I. Disperse Yellow 14 (10 340), C.I. Disperse Yellow 17 (10 349), C.I. Disperse Yellow 33 (10 337), C.I. Disperse Yellow 34, C.I. Disperse Yellow 42 (10 338), C.I. Disperse Yellow 59, C.I. Disperse Yellow 86 or C.I. Disperse Orange 15 (10 350).

Dyes F further include for example C.I. Disperse Yellow 83 and C.I. Disperse Orange 72.

Preference is given to dye mixtures containing dyes F having an absorption maximum at a wavelength of from 400 to 520 nm, in particular at from 410 to 510 nm.

Preference is further given to dye mixtures containing one or more thiophene-azo dyes of the above-mentioned formula where $R^1$ is formyl, $R^2$ is chlorine and $R^3$ is cyano or $C_1$–$C_4$-alkoxycarbonyl.

Preference is further given to dye mixtures containing one or more dyes F which are members of the class of monoazo or disazo dyes or quinophthalone dyes.

Particularly important navy and black dye mixtures are those containing as dyes F C.I. Disperse Yellow 64, C.I. Disperse Yellow 114, C.I. Disperse Yellow 198, C.I. Disperse Orange 13, C.I. Disperse Orange 29, C.I. Disperse Orange 30, C.I. Disperse Orange 49, C.I. Disperse Red 54:1, C.I. Disperse Red 135 or C.I. Disperse Red 167:1.

In the dye mixtures according to the invention, the proportion of thiophene-azo dyes should be from 60 to 99% by weight, based on the total weight of the thiophene-azo dyes and dyes F in the mixture. Preference is given here to those dye mixtures where the proportion of thiophene-azo dyes is from 65 to 95% by weight, based on the total weight of the thiophene-azo dyes and dyes F in the mixture. The proportion of dyes F is consequently from 1 to 40% by weight, preferably from 5 to 35% by weight, each based on the total weight of the thiophene-azo dyes and dyes F in the mixture. All these percentages are based on the dyes only and do not take into account any other components present.

The dye mixtures according to the invention are prepared by mixing the particular components in the stated weight ratio. The novel mixtures may be admixed with further components, for example dispersants. It is also possible to mix previously prepared dye formulations of the particular components, in which case again the abovementioned weight ratio must be complied with.

The novel navy and black dye mixtures are suitable for dyeing and printing polyester fabrics, giving dyeings and prints in navy to black shades which are notable for a high light fastness.

The dyeing and printing methods are known per se. Further details may also be taken from the Examples.

A further advantage of the dye mixtures according to the invention is their occupational safety.

The following Examples illustrate the invention in more detail:

(A) DYEING BY THE EXHAUST METHOD 10 g of polyester fabric are introduced at 60° C. into 200 ml of a dyeing liquor which contains $Z^1$% by weight of dye mixture, based on the polyester fabric, and whose pH has been set to 4.5 by means of acetic acid. The fabric is treated at 60° C. for 5 minutes, and the liquor is then raised to 135° C. in the course of 30 minutes, maintained at that temperature for 60 minutes and then cooled down to 60° C. in the course of 20 minutes.

Thereafter the dyed polyester fabric is reduction cleared by treating it at 65° C. for 15 minutes in 200 ml of a liquor containing 5 ml/l of 32% strength by weight sodium hydroxide solution, 3 g/l of sodium dithionite and 1 g/l of an addition product of 48 mol of ethylene oxide on 1 mol of castor oil. The fabric is finally rinsed, neutralized with dilute acetic acid, rinsed once more and dried.

(B) DYEING BY THERMOSOLING 100 g of polyester fabric are introduced into 1000 ml of a dyeing liquor containing $Z^2$ g/l of dye mixture and 10 g/l of an antimigration agent based on a copolymer of acrylic acid. The fabric is then squeezed off in a pad-mangle to a wet pickup of 50%, dried at from 110° to 115° C. for 1 minute and then fixed at 210° C. for 1 minute. Thereafter the dyed fabric is rinsed, reduction cleared and finished, the last two steps being carried out as described under (A).

(C) PRINTING METHOD

A print paste is prepared from 600 g of a thickener containing 20 g of a starch ether and 40 g of bean ether gum in water, 15 g of nitrobenzenesulfonic acid, 40 g of a fatty acid ester, $Z^3$ g of dye mixture and sufficient water to produce 1 kg of print paste. The print paste is then brought to a pH of 5.5 with citric acid.

Polyester fabric is printed with this print paste and dried at 70° C. for 5 minutes. The dye is then fixed at 175° C. with superheated steam in the course of 6 minutes. The printed fabric is then rinsed, reduction cleared and finished, the last two steps being carried out as described under (A).

The mixtures given in Tables 1 and 2 below were each applied by the exhaust method. The dye quantities used are based on the depth of navy stage 1.

TABLE 1

| Constituents of mixture [g] | Mixture No. 1 | 2 | 3 | 4 |
|---|---|---|---|---|
|  | 18 | 18 | 18 | 16 |
| 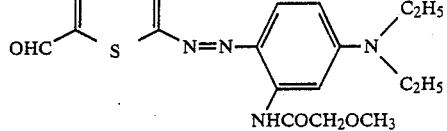 | — | 18 | — | — |
| 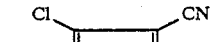 | — | — | 18 | — |
| 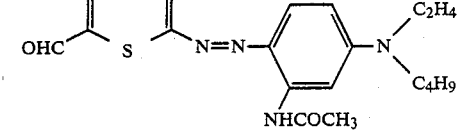 | 18 | — | — | — |
| 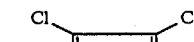 | — | — | — | 20 |
| C.I. Disperse Yellow 64 | 2 | — | 2 | 2 |
| C.I. Disperse Yellow 198 | — | 2 | — | — |
| Dispersant based on ligninsulfonate | 62 | 62 | 62 | 62 |
| Amount $Z^1$ of mixture used [% by weight, based on polyester fabric] | 2.75 | 2.50 | 3.00 | 2.50 |

TABLE 2

| Constituents of mixture [g] | Mixture No. 5 | 6 | 7 | 8 |
|---|---|---|---|---|
| 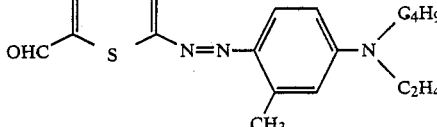 | 33 | 31 | — | — |
|  | 4.25 | — | 6.25 | — |

TABLE 2-continued

| Constituents of of mixture [g] | Mixture No. | | | |
|---|---|---|---|---|
| | 5 | 6 | 7 | 8 |
| 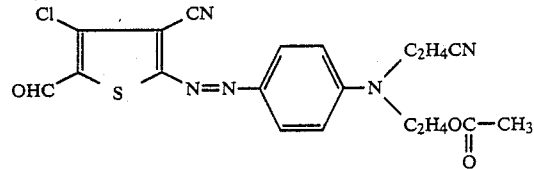 | — | 6.3 | — | 8 |
| 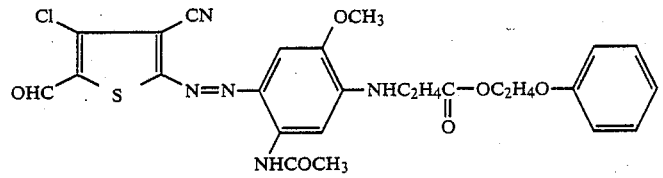 | — | — | 33.2 | 31.6 |
| C.I. Disperse Red 54:1 | 2.75 | 2.7 | — | — |
| C.I. Disperse Red 167:1 | — | — | 0.55 | 0.4 |
| Dispersant based on ligninsulfonate | 60 | 60 | 60 | 60 |
| Amount $Z^1$ of mixture used [% by weight, based on polyester fabric] | 4.38 | 4.35 | 2.90 | 3.32 |

The mixtures listed in Table 3 below were each applied by thermosoling. The dye quantities used produce in the case of mixtures of 9 to 12 dyeings in the depth of navy stage 1. Mixture 12 gives a dyeing having a black shade.

TABLE 3

| Constituents of of mixture [g] | Mixture No. | | | |
|---|---|---|---|---|
| | 9 | 10 | 11 | 12 |
| 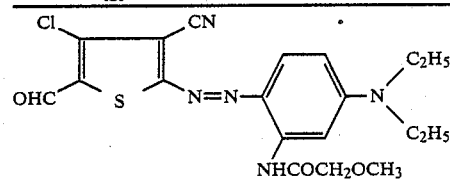 | 12 | 10.7 | 16 | 6 |
| 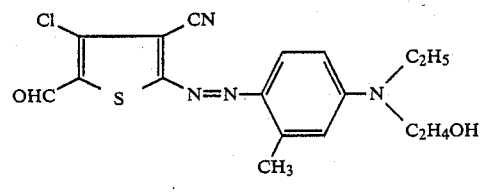 | 22 | — | — | — |
| 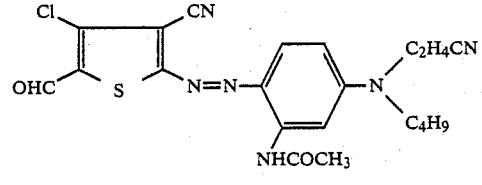 | — | 10.7 | — | — |
| 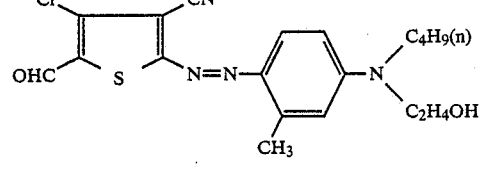 | — | — | 16 | — |
| 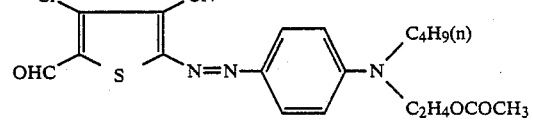 | — | — | — | 12 |

TABLE 3-continued

| Constituents of of mixture [g] | Mixture No. 9 | 10 | 11 | 12 |
|---|---|---|---|---|
| 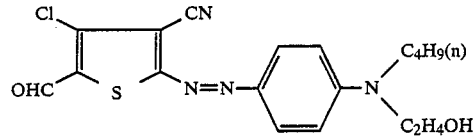 | — | 10.7 | — | — |
| 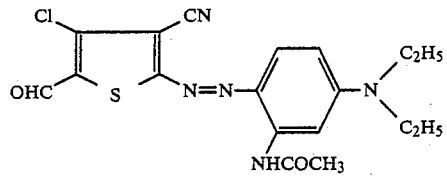 | — | — | — | 10 |
| C.I. Disperse Yellow 198 | — | 4 | — | 2 |
| C.I. Disperse Orange 29 | 7.5 | — | 10 | 10 |
| Dispersant based on ligninsulfonate | 58.5 | 63.9 | 58 | 60 |
| Amount $Z^2$ used of mixture [g/l of padding liquor] | 25 | 40 | 25 | 60 |

The mixtures listed in Table 4 below were each applied by printing. The dye quantities used produce in the case of mixture 13 a print having a navy shade and in the case of mixture 14 a print having a black shade.

TABLE 4

| Constituents of of mixture [g] | Mixture No. 13 | 14 |
|---|---|---|
| 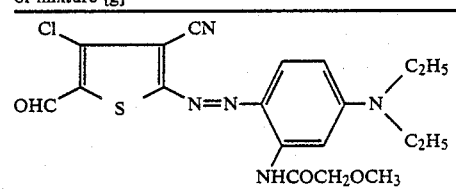 | 18 | 6 |
| 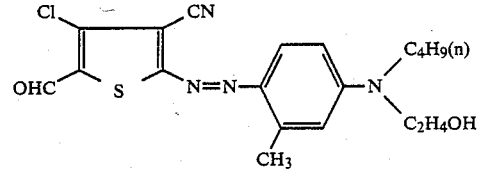 | 18 | — |
| 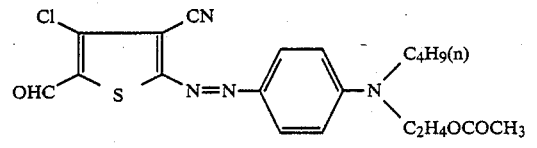 | — | 12 |
| 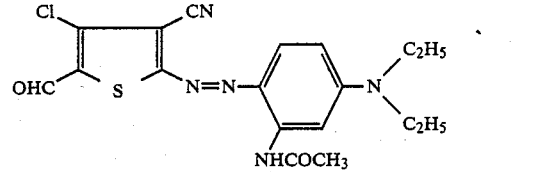 | — | 10 |
| C.I. Disperse Yellow 64 | | |
| C.I. Disperse Orange 29 | 2 | 2 |
| Dispersant based on ligninsulfonate | — | 10 |
| | 62 | 60 |
| Amount $Z^3$ of mixture used [g/kg of print paste] | 40 | 80 |

We claim:

1. A navy or black dye mixture containing one or more thiophene-azo dye of the formula

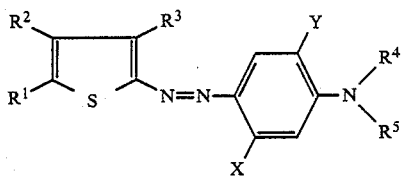

where
R$^1$ is formyl, cyano or phenylsulfonyl,
R$^2$ is halogen, C$_1$-C$_8$-alkoxy, substituted or unsubstituted phenoxy, C$_1$-C$_6$-alkylthio, phenylthio, C$_1$-C$_4$-alkylsulfonyl or phenylsulfonyl,
R$^3$ is cyano, C$_1$-C$_6$-alkoxycarbonyl whose alkyl chain may be interrupted by one or more oxygen atoms, carbamoyl or C$_1$-C$_4$-mono- or dialkyl-carbamoyl,
R$^4$ and R$^5$ are identical or different and each is independently of the other C$_1$-C$_4$-alkyl which may be substituted by hydroxyl, C$_1$-C$_4$-alkoxy, cyano, C$_1$-C$_4$-alkanoyloxy, C$_1$-C$_4$-alkoxycarbonyloxy or C$_1$-C$_4$-alkylaminocarbonyloxy,
X is hydrogen, C$_1$-C$_4$-alkyl, C$_1$-C$_4$-alkoxy, chlorine, bromine or the radical —NH—CO—R$^6$ where R$^6$ is C$_1$-C$_4$-alkyl, which may be substituted by C$_1$-C$_4$-alkoxy, phenoxy, cyano, hydroxyl, chlorine or C$_1$-C$_4$-alkanoyloxy, or is unsubstituted or C$_1$-C$_4$-alkoxy-substituted phenoxy, and
Y is hydrogen, C$_1$-C$_4$-alkyl or C$_1$-C$_4$-alkoxy, and one or more dye F whose adsorption maximum is at a wavelength of from 390 to 520 nm, wherein the proportion of thiophene-azo dye is from 60 to 99% by weight and the proportion of dye F is from 1 to 40% by weight, based on the total weight of thiophene-azo dye and dye F in the mixture and wherein said dye F is a member of a class selected from the group consisting of monoazo dyes, disazo dyes, anthraquinone dyes, methine dyes, quinophthalones, naphtholactam dyes, coumarin dyes, and diphenylamine dyes.

2. A dye mixture as claimed in claim 1, wherein R$^1$ is formyl, R$^2$ is chlorine and R$^3$ is cyano or C$_1$-C$_4$-alkoxycarbonyl.

3. A dye mixture as claimed in claim 1, containing as dyes F those which are members of the class of monoazo or disazo dyes or quinophthalone dyes.

4. The dye mixture as claimed in claim 1, wherein said dye F is one member selected from the group consisting of C.I. Disperse Yellow 64, C.I. Disperse Yellow 114, C.I. Disperse Yellow 198, C.I. Disperse Orange 13, C.I. Disperse Orange 29, C.I. Disperse Orange 30, C.I. Disperse Orange 49, C.I. Disperse Red 54:1, C.I. Disperse Red 135 and C.I. Disperse Red 167:1.

* * * * *